Dec. 16, 1941.                R. N. FRAWLEY ET AL                    2,266,315
                                PRESSURE INDICATOR
                                Filed June 20, 1940
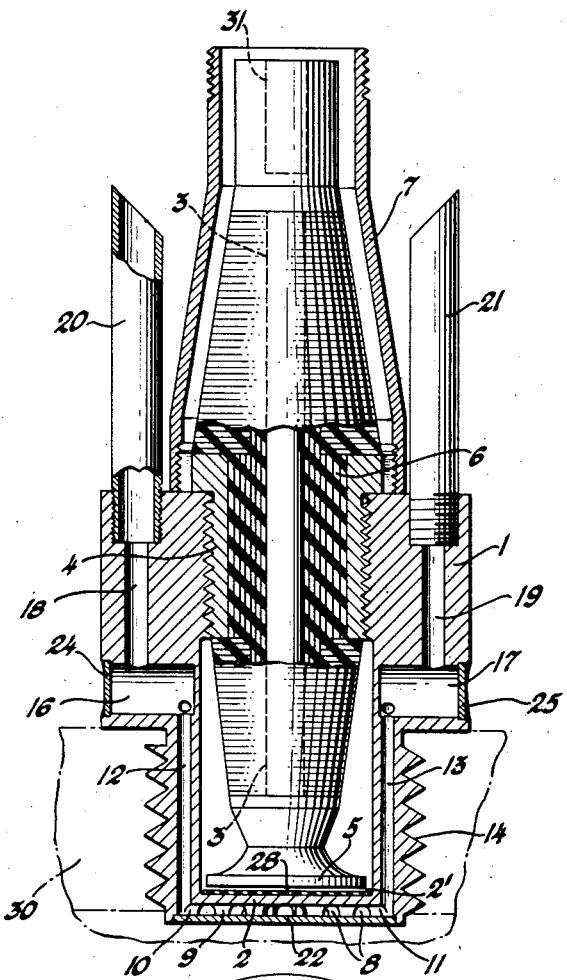
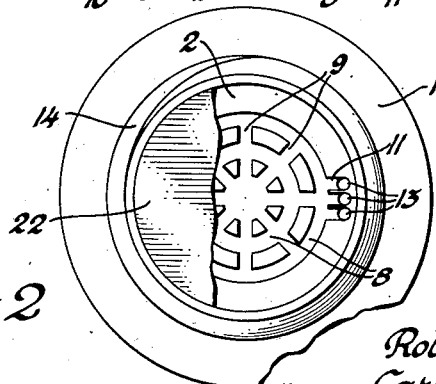
Inventors
Robert N. Frawley &
Carl E. Grinstead
By Blackmor, Spencer & Flint
Attorneys Patented Dec. 16, 1941

2,266,315

UNITED STATES PATENT OFFICE 2,266,315

PRESSURE INDICATOR

Robert N. Frawley and Carl E. Grinstead, Detroit, Mich., assignors to General Motors Corporation, Detroit, Mich., a corporation of Delaware Application June 20, 1940, Serial No. 341,509

4 Claims. (Cl. 175—41.5)

This invention relates to an electrical capacity type pressure indicating pick up element adapted to be used in a suitable electrical circuit for qualitative and quantitative measurements of static and dynamic pressures, stresses or strains. It is especially suitable for measuring and recording rapidly fluctuating pressures in combustion chambers of internal combustion engines.

The device essentially consists of a fixed condenser plate spaced from a condenser plate capable of minute displacement, the degree of separation of the plates, and hence the electrical capacity of the element in a suitable electric circuit, being varied by the pressure to be measured.

Changes in the capacity of the indicator may influence any suitable recording devices such as meters and oscillographs in known manner.

Such indicator pick ups in which the movable condenser plate is a diaphragm subjected to the pressure to be measured have heretofore been proposed but their form and construction have left much to be desired.

The object of the invention is an indicator in which the diaphragm is flush with the wall of the pressure chamber in which the pressures are to be measured, is adequately water cooled, and has a high spring rate with low inertia, for quickness of response and so that it is comparatively unaffected by engine vibrations.

Other objects of the invention are an indicator which is sturdy, compact, symmetrical and durable.

According to the invention, the body of the pressure indicating pick up element is made of Invar steel to minimize the effect of temperature variations under the conditions in which the indicating element is used. It will be appreciated that temperature differences due to speed and load changes of the engine tend to produce expansion and contraction of the parts of the indicator which would affect the response of the indicator and its sensitivity. The use of Invar steel reduces the changes of dimensions or elastic properties of the diaphragm and associated parts with temperature changes to a minimum.

Still further to reduce temperature effects to a minimum and to prevent destruction of the diaphragm under the severe conditions to which it is exposed, water cooling of the diaphragm is provided for. The body of the indicator is very robust and all the parts are accurately machined so that the parts forming the condenser plates are parallel. The insulated electrode is of small capacity compared to the total capacity of the indicator which of course functions only through a very small range of capacity change.

The above and other objects of the invention will be apparent as the description proceeds.

The drawing shows a preferred construction according to the invention.

In the drawing:

Fig. 1 is a view of the indicator pick up in part sectional elevation.

Fig. 2 is a partly broken away view of the lower end of Fig. 1.

The body, frame, or shell, 1 of the indicator, is of Invar steel, formed as a socket with an integral heavy diaphragm 2 at its base, which constitutes the movable condenser plate.

Within the body 1 is a central electrode 3, mounted in a bushing 4, which screws into the body 1. The central electrode carries a tip 5 of stainless steel, constituting a fixed condenser plate, spaced from the deflectable diaphragm condenser plate 2 by an air gap 2'. The central electrode 3, with its fixed condenser plate 5, is insulated from the bushing 4 and the body 1, by mica 6.

A brass electrode shield 7 surrounds that portion of the electrode extending outside the body 1, and is screwed on to the bushing 4.

Concentric ring grooves 8, with connecting passages 9, are machined in the underside of the diaphragm 2, and are connected by short passages 10 and 11, with a plurality of drilled ducts 12 and 13, at opposite sides of the externally threaded portion 14 of the body 1. The ducts 12 and 13 extend into diametrically opposite radial pockets 16 and 17, communicating with ducts 18 and 19, to which water pipes 20 and 21 are respectively connected.

A sealing disc 22 covers the grooves and passages 8, 9, 10 and 11, and is copper brazed in place, to seal the passages and form part of the diaphragm 2, while the pockets 16 and 17 are closed by plugs 24 and 25.

Cold water from any suitable source of supply flows into the indicator through the pipe 20, through the connected passages, and out through the pipe 21, to cool the indicator and particularly the diaphragm 3. The water outlet from the indicator is larger than the inlet thereinto in order to prevent excessive pressure building up on the diaphragm which may be due to water main pressure and high rate of flow.

If desired, the air gap 2' between the plates 2 and 5 may be filled with any suitable dielectric material.

In the example illustrated, a thin disc of mica 28 is placed in the air gap to prevent "shorting" by any metallic dust particles which might be present between the plates. The mica disc 28 increases the capacity as well as the sensitivity of the indicator.

As shown, the threaded portion 14 of the body 1 is screwed into the wall 30 of an engine combustion chamber. In this way the body 1 and hence the diaphragm plate 2 of the indicator is grounded to the engine, while a socket 31 in the electrode 3 is provided for a cable connection thereto and hence to the fixed plate 5.

In the illustrated example of an indicator according to the invention and designed for measuring peak pressures up to 600 lbs. per sq. in. the diaphragm is $\frac{7}{8}$ inch in diameter and is .065 inch thick, of which the water cooling ring grooves are covered with a sealing disc .010 inches thick. The separation between the fixed condenser plate and the diaphragm or grounded condenser plate is .002 inch. In the spaces between the two plates there is a mica disc .001 inch thick, leaving an air space .001 inch thick. In use, the indicator is designed for pressures which will deflect the diaphragm not more than .0003 inch. Complete electrical shielding of the indicator, connecting cable and all electrical units is necessary in order that electrical pick up may be entirely eliminated.

The electrical capacity of the indicator, due to the separation of the condenser plates as shown, may be part of a tuned circuit in an oscillator detector unit. Any variation of capacity in the indicator caused by deflection of the diaphragm will change the tuning of the indicator circuit and thus change its response to a constant frequency generated by a stable oscillator. Any change of response may be amplified by a suitable amplifier before it is passed to a viewing or recording oscillograph in known manner.

The principle of the condenser plate indicator with associated electrical equipment is not limited to pressure measurements. It can be used to study the amplitude and wave form of small deflections of moving bodies.

We claim:

1. In a pressure indicating pick up element of the electrical capacity type, in which a fixed condenser plate is formed at one end of a central electrode insulated from but securely held in a surrounding body formed as a socket with a deflectable diaphragm end spaced from the fixed condenser plate and constituting the movable condenser plate, the degree of separation of said plates and hence the capacity of the indicator depending on the extent to which the diaphragm is deflected by the pressure to be measured, water cooling passages through said deflectable diaphragm condenser plate, and ducts in the body for conducting cooling water to and from said passages.

2. The combination according to claim 1 in which the water cooling passages through said deflectable diaphragm condenser plate are formed as intersecting grooves over the area of the outside of the socket end, said grooves being covered by a sealing disc secured to the socket end and constituting part of the deflectable diaphragm.

3. The combination according to claim 1 in which the water cooling passages through said deflectable diaphragm condenser plate are formed as concentric ring grooves and intersecting radial grooves over the area of the outside of the socket end, said grooves being covered by a sealing disc secured to the socket end and constituting part of the deflectable diaphragm.

4. The combination according to claim 1 in which the ducts in the body for conducting cooling water to and from the water cooling passages through said deflectable diaphragm include a plurality of ducts extending longitudinally through opposite sides of the socket walls from each of two diametrically opposite radial pockets to which inlet and outlet water pipes are respectively connected.

ROBT. N. FRAWLEY.
CARL E. GRINSTEAD.